March 2, 1926.
R. R. SHIVELY
1,575,514
APPARATUS FOR MAKING GLASS AND PROCESS THEREFOR
Filed April 12, 1924
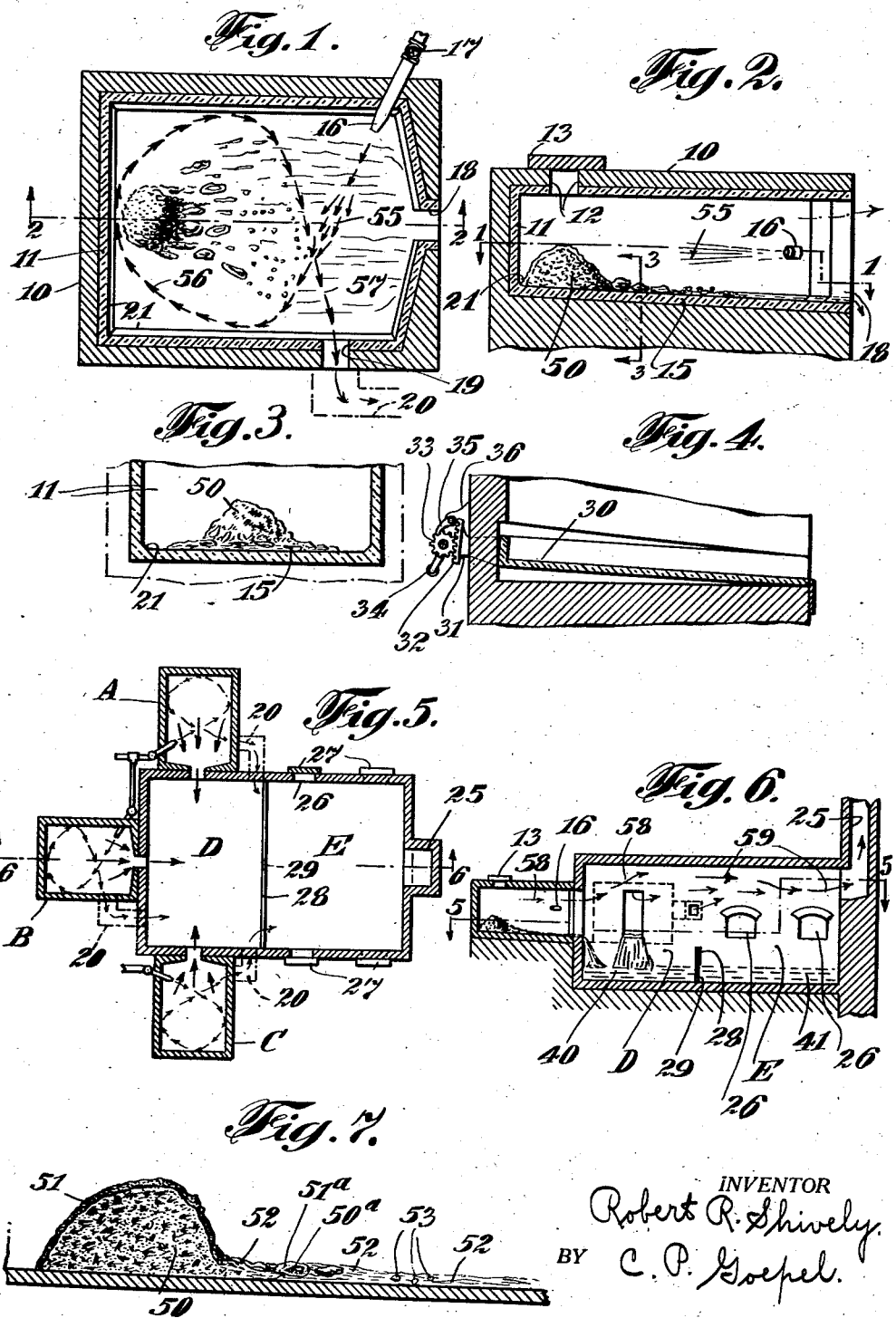
INVENTOR
Robert R. Shively.
BY C. P. Goepel.
ATTORNEY Patented Mar. 2, 1926.

1,575,514

UNITED STATES PATENT OFFICE.

ROBERT R. SHIVELY, OF WASHINGTON, PENNSYLVANIA, ASSIGNOR TO B. F. DRAKENFELD & CO. INC., OF NEW YORK, N. Y., A CORPORATION OF NEW YORK.

APPARATUS FOR MAKING GLASS AND PROCESS THEREFOR.

Application filed April 12, 1924. Serial No. 706,010.

*To all whom it may concern:*

Be it known that I, ROBERT R. SHIVELY, manufacturer, a citizen of the United States, and a resident of Washington, in the county of Washington, State of Pennsylvania, have invented certain new and useful Improvements in Apparatus for Making Glass and Processes Therefor, of which the following is a specification.

This invention relates to the art of glassmaking and has for its object to provide a simple apparatus adapted to be used in the art of glass-making and also has for its object to provide a new method of making glass.

Heretofore glass has been made by melting or fusing the raw material in large melting pots or tanks. The fused material was then collected in a second chamber from which it could be worked. The objection to the processes heretofore used was that the melting pots or tanks were of considerable size and this required a large amount of glass to be operated upon at one time, and also considerable time.

My invention overcomes these disadvantageous features and others and consists essentially in melting raw material, continuously in small quantities and in a single continuous operation. For this purpose my invention consists of the particular apparatus hereinafter described and shown in the drawings and finally claimed, as also the novel process hereinafter defined and claimed.

According to my invention, relatively small quantities of raw material of which the glass is to be made, are subjected to a melting temperature and the melted glass flows away from the raw material as it melts, the melted glass being subjected simultaneously to this high heat so as to weld or fuse any entrained raw material. The raw material is thereby entirely fused into glass, and simultaneously therewith it is subjected to the same high temperature so as to eliminate quickly any bubbles, seeds, etc. In other words, it is "plained", a term well understood in the art.

As is known these bubbles or seeds result from certain gaseous formations depending upon the character of the raw material used. The maintenance of the glass after it is formed from the raw material, in a fluid state due to the presence of this high temperature, enables the bubbles or seeds to readily pass off due to the high viscosity maintained. During the formation of the glass, its flowing and its plaining, the high temperature acts upon relatively small quantities of the glass, it being desirable for this purpose to maintain the glass flow in a spread out condition, so as to enable the high temperature to act on all portions thereof and throughout its depth.

Another important feature of the invention is that by the high temperature acting upon the raw material, a film of fused glass surrounds the raw material which thereby prevents volatilization and holds the raw material captured. This coating of fused glass then flows off from the raw material and while so flowing is continuously subjected to such high temperature.

Another important feature is the fusing of the raw material in the manner just stated. Thereby the glass is subjected in a relatively thin layer to the highest degree of temperature available. It is this high temperature acting upon a relatively thin layer that readily brings about the condition known as plaining. A glass is thereby produced that is ready to be utilized either for blowing or pressing into a finished product.

Heretofore it has been customary to fuse the raw material while in large pots which simultaneously also plained the glass. The objection to this method is that a larg. quantity of the batch was necessarily treated and that therefore it required a long period to bring the glass into suitable condition; that is, it would take about twenty-four hours to bring the glass into working condition in the case of pot furnace operations. In the case of continuous tanks the batch is introduced intermittently, but experience indicates that this glass is not brought through the tank for several days.

Contrary to this in my new method the glass is not subjected to a melting temperature more than a few minutes.

A further advantage of my invention is that the required installation is relatively small and inexpensive. It may be readily repaired without shutting down the operation. There is a great surface to the mass, and this large area compared to the depth, results in economy of fuel consumption.

A further advantage of my invention is that the plaining is controlled by the temperature which plaining can also be controlled by variations in the inclination of the floor of the fusing chamber.

Contrary to methods heretofore used the receiving chamber is maintained at a relatively low temperature and this assures long life of the clay products of which the receiving chamber is constructed. The receiving chamber generally speaking should last almost indefinitely. The high temperature chambers can be operated independently of the receiving chamber.

A further advantage is that where the installation provides for a plurality of high temperature chambers connecting with one receiving chamber, any high temperature chamber can be put of commission, and repaired without interrupting the high temperature of the other high temperature chambers and the receiving chambers connected therewith.

The improved process provides a consistently continuous operation in which the glass is removed as rapidly as it is plained and in which there is a small volume being treated continuously whereby a better control can be obtained and the usual losses which result due to volatilization in melting in the long and continued heat treatment processes are minimized.

This reduction of losses by volatilization is of particular importance in the case of opal or white glasses, colored glass and other special glasses.

The excess heat from the high melting chambers is utilized in the receiving chamber for maintaining the collected glass in a molten condition to enable it to be worked.

The glass as it is being fused and plained is subject to as little agitation as possible for which reason it is caused to flow smoothly down the inclined bottom of the high melting chamber into the receiving chamber.

All of the melting takes place in the melting chamber and the melting is carried out by having the high heat act upon relatively small quantities of raw material, the fusing brings about a uniform glass product without foreign materials being joined therewith, and due to the continuous movement of the glass along the bottom, the glass that is produced is of a uniform character throughout.

When this glass is cooled in the receiving chamber which has a temperature less than that of the melting chamber, the glass is not likely to take up from the receiving chamber walls any foreign material. This is particularly so as a relatively small amount of glass is exposed to the walls of the receiving chambers, since the glass is continually being worked out. In the methods heretofore used where the fusing of the glass took place in large quantities, and over long periods, the fused glass would take up from the walls of the fusing chamber, certain chemical elements and form strias and cords and the like, which are absent in our process.

In the accompanying drawings,

Fig. 1 is a horizontal section taken on line 1—1 of Figure 2;

Fig. 2 is a section taken on line 2—2 of Figure 1;

Fig. 3 is a sectional view taken on line 3—3 of Figure 2;

Fig. 4 is a sectional view of a portion of a modified form of furnace in which the bottom is adapted to be inclined to different positions;

Fig. 5 shows the arrangement of several of the furnaces shown in Figures 1 and 2 in connection with the collecting chamber;

Fig. 6 is a vertical section taken on line 6—6 of Figure 5; and

Fig. 7 is a diagrammatic view of raw material being fused to fluid state, in a single continuous operation.

Similar characters of reference indicate corresponding parts throughout the various views.

Referring to the drawings, and more particularly to Figures 1 and 2, the furnace there shown consists of a casing or furnace proper 10 having inner walls 11 with an opening at the top thereof indicated at 12, through which the supply of raw material is introduced. The burner enters at the side of the furnace, so that the flame will enter the furnace substantially diagonally thereto as indicated in Figure 1. The burner 16 may be suitably controlled by a valve 17. The sides of the bottom 15 are provided with angular surfaces indicated by 21, which serve to cause any material to drop toward and onto the bottom 15. The raw material having been charged through the opening 12 as indicated in Figure 2, the heat of the flame indicated by the arrows 55 and 56, passes around and over the charge of the material 50 and fuses the exterior of the same. By controlling the flow of the heating medium in this manner and directing the same into enveloping contact with the mass of raw material, the heat effect upon the surface of the mass is uniformly distributed and therefore, as the material is fused, there occurs a progressive and substantially uniform reduction in bulk of the mass. The fused material runs off due to the inclination of the bottom 15 and carries with it, in some cases, certain portions of the raw material. As indicated in Figure 7, the heat of the flame however causes the entrapped raw material 50ª, which is surrounded by a film of fused material 51ª, to be entirely fused into fluid state. Due to the general direction as also the deflection of the heat waves as indicated by the arrows 56 and 57 in Figure 1, this fused material in fluid state is subjected to further heat, particularly so, as it is spread in relatively small quantities upon the bottom 15. As is well known in the art of making glass, the fused material may have therein certain bubbles or seeds, and the further heat acting upon the fluid fused material causes these bubbles or seeds to be removed in that the viscosity of the fluid material becomes such as to enable these bubbles to rise to the surface and thereby be eliminated from the fused material. This stage of the operation is known as plaining. When, therefore, the fluid fused material passes approximately the position of the juncture of the flame and the heat waves as indicated by the position where the character 55 appears in Figure 1, the glass has been subjected to such heat as to not only fuse all the raw material but also to remove all the bubbles and seeds, and plain the glass. The glass then flows downwardly and through opening 18 into the collecting chamber D.

The action that has just been described may be carried out simultaneously in different furnaces as indicated in Figure 5 in which there are arranged three furnaces, A, B and C. Some of the heat of the furnaces A, B and C passes out of the flues 20 and enters the chamber D passing therethrough at the upper part thereof and then enters the chamber E at reduced temperature and then finally enters the chimney 25 as shown in Figure 6. The temperature of the heat entering the chamber D by means of the flues 20 is less than when in the melting chamber so that this temperature maintains the glass in the chamber D at a considerable temperature but by the time these heat waves reach the upper part of the chamber E, the temperature is reduced to such a degree as to correspond to a "working temperature" and the glass in the chamber E is thereby brought to a temperature corresponding to a working temperature. That is, the glass in the chamber E may be worked by the operators either by inserting tools therein and then blowing the glass, or by having this glass flow into molds and thereby molded to shape. For this purpose the chamber E is provided with openings 26 that are closed by doors or the like as indicated by 27. The flow of the heat waves passing out of the chambers A, B and C either directly from the chamber as indicated by the arrow in Figure 2 or by the arrows 58 in Figure 6, flows along the upper part of the chambers D and E until it exhausts at the chimney 25. The advantage of providing a furnace of the character shown in Figure 5 is that in the event any one of the furnaces A, B or C requires repairing they may be readily repaired and the other furnaces may still be used to supply glass to the working chamber E.

The amount of glass supplied to the collecting chamber D or the working chamber E depends upon the heat on the one hand and, on the other hand, upon the inclination of the bottom 15. Different mixtures or formulas fuse relatively slower or quicker. In order to determine, however, the rate of flow of the fused material by means of the inclination of the bottom, a bottom 30 is provided which is adjustable in respect to its inclination. This bottom 30 has an extending member 31 provided with a segment 32 operated by a pinion 33 which in turn is operated by a handle 34, this pinion being held in position by a pawl 35 supported by a bracket 36. By the rotation of the pinion 33, the bottom 30 may have its end raised or lowered and thereby various inclinations may be given to the bottom depending upon the rate of flow desired.

In any of the foregoing embodiments of my invention, any suitable constituents may be mixed or any suitable proportions may be used as required, as known to one skilled in the art. The important feature is however to finely grind these and thoroughly mix the same.

In Figure 7 is shown diagrammatically the action of the hot flame upon the raw material 50. When the flame acts upon the heap of raw material, the outermost portion of the raw material is fused, and this fused portion provides a film of fused material completely enveloping the remaining raw material. When the fused material is heated sufficiently to form a fluid, it flows downwardly as indicated by 52 along the inclined bottom. In some cases portions of the raw material are severed from the heap by the fused film. These portions of raw material are indicated by 50ª and are surrounded by the fused envelope 51ª. The fused film is indicated by 52. When the fused material is still further acted upon by the high heat, the viscosity of the same is rendered such as to enable any entrapped air or gas as for instance the bubbles or seeds 53 to be readily eliminated, so that by the time the fused material or glass reaches the place indicated approximately by 55 in Figure 1, the entire fused material is free from entrapped raw material and also free from entrapped bubbles or seeds of gas or air. It will be noted that as the raw material is fused it spreads radially in different directions as shown in Figure 1 and that throughout the operation the fused material flows in a relatively thin layer or film over the bottom 15. This being so, the high temperature can act throughout the thickness or depth of the film and the operation is consequently very rapid and efficient. While the glass is in any of the furnaces A, B or C, it is entirely fused and at the same time plained. The melting is a single continuous operation. The plained glass then flows as shown in Figure 6 into the collecting chamber D, the various furnaces A, B or C discharging therein as seen in Figure 6.

In order to have a substantially uniform character of product in the working chamber E, a wall 28 is provided which extends transversely to the chamber, and is provided with an opening 29 through which the glass flows from the collecting chamber D to the working chamber E. By this method, a substantially uniform product is maintained at all times in the collecting chamber E.

I have shown and described a furnace in which the raw material from which the glass is formed may be melted and I have shown several of these furnaces in simultaneous operation, but I do not wish to be understood that my furnace is confined to the use of all of these. Any one or more than one, or all of the chambers A, B and C can be used.

My invention also includes the novel process consisting in melting continuously in a single operation small quantities of glass material and simultaneously removing the fused material as it is melted, such removing being continuous with the melting operation. The continuous removal of the molten glass as it is heated enables a product of greater uniformity to be obtained, and enables such a product to be produced at a cost less than the present cost.

This invention may be developed within the scope of the following claims without departing from the essential features of the same and it is desired that the specification and drawings be read as being merely illustrative and not in a limiting sense except as necessitated by the prior art.

I claim:—

1. In the art of making glass, placing a mass of the raw materials within a furnace chamber, said mass covering a minor portion of the chamber floor surface adjacent one end thereof, directing a heating medium into enveloping contact with said mass to subject the surface thereof to the uniformly distributed heat effect of said medium whereby the mass is fused with a progressive and uniform reduction in the bulk thereof, and directing the melt away from said mass as the latter is fused to an outlet at the opposite end of the furnace chamber.

2. In the art of making glass, that step which consists in subjecting a mass of the raw materials within a furnace chamber to the action of a heating medium whereby the materials are caused to fuse and directing the flow of the fused materials towards the point of ingress of the heating medium to an outlet, and directing the heating medium between the point of ingress thereof and said mass into contact with the flowing fused materials.

3. In the art of making glass, subjecting a mass of the raw materials in a furnace chamber to the action of a fluid heating medium and directing said heating medium into enveloping contact with the mass to progressively fuse the same, directing the flow of the fused materials from the mass towards the point of ingress of the heating medium to an outlet, and directing the heating medium at an angle with relation to the direction of flow of the fused materials and in contact therewith intermediate its point of egress from the furnace chamber and said mass.

4. In the art of making glass, subjecting a mass of the raw materials in a furnace chamber to the action of a fluid heating medium and directing the flow of the heating medium within the furnace chamber between spaced points of ingress and egress thereof whereby the heating medium is caused to envelop the mass of raw materials and progressively fuse the same, directing the fused materials from the mass to an outlet and causing the incoming and outgoing streams of the heating medium to cross each other in intersecting vertical planes across the surface of the flowing fused materials.

5. A glass furnace, comprising a melting chamber, a burner in one wall of the melting chamber for melting the materials, the heat of said burner fusing the material, and then passing over the fused material, while it passes over the bottom of the chamber in spread out form, and a collecting chamber for collecting the fused material and receiving the remaining heat of the fusing chamber and means for changing the inclination of the bottom of the melting chamber.

6. A glass furnace comprising a furnace chamber having means for feeding the raw materials into one end of said chamber and provided with an outlet for the fused materials at the opposite end of the chamber, a burner for supplying a fluid heating medium through one side of the chamber across the line of flow of the fused materials, and the opposite side of said chamber having an egress opening for the heating medium.

7. A glass furnace, comprising a tank for holding the glass to be worked, a second tank, a partition having an opening between said tanks, a fusing chamber having a feeding opening, for feeding material therein, and having an inclined bottom, a burner diagonally placed in one wall of the fusing chamber, and directed against the material to be fused, means deflecting the heat of the burner from the material being fused over the fused and flowing material, and means conducting the remaining heat from the fusing chamber first to the first tank and then to the second tank.

In testimony that I claim the foregoing as my invention I have signed my name hereto.

ROBERT R. SHIVELY.